(12) United States Patent
Belin et al.

(10) Patent No.: US 12,586,564 B1
(45) Date of Patent: *Mar. 24, 2026

(54) USER FEEDBACK FOR SPEECH INTERACTIONS

(71) Applicant: Amazon Technologies, Inc., Seattle, WA (US)

(72) Inventors: Gilles Jean Roger Belin, Seattle, WA (US); Charles S. Rogers, III, Seattle, WA (US); Robert David Owen, Sammamish, WA (US); Jeffrey Penrod Adams, Tyngsborough, MA (US); Rajiv Ramachandran, Seattle, WA (US); Gregory Michael Hart, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/657,106

(22) Filed: May 7, 2024

Related U.S. Application Data

(63) Continuation of application No. 17/731,968, filed on Apr. 28, 2022, now Pat. No. 12,008,983, which is a (Continued)

(51) Int. Cl.
*G10L 15/00* (2013.01)
*G10L 15/22* (2006.01)
(Continued)

(52) U.S. Cl.
CPC .............. *G10L 15/00* (2013.01); *G10L 15/22* (2013.01); *G10L 15/01* (2013.01); *G10L 2015/221* (2013.01); *G10L 15/26* (2013.01)

(58) Field of Classification Search
CPC .......... G10L 15/00; G10L 15/26; G10L 15/01
See application file for complete search history.

(56) References Cited

U.S. PATENT DOCUMENTS

| | | |
|---|---|---|
| 5,864,810 A | 1/1999 | Digalakis et al. |
| 6,012,030 A | 1/2000 | French-St. George et al. |
| | (Continued) | |

FOREIGN PATENT DOCUMENTS

WO      WO2011088053 A2      7/2011

OTHER PUBLICATIONS

Office Action for U.S. Appl. No. 16/664,459, mailed on Feb. 20, 2020, Belin, "User Feedback for Speech Interactions", 11 Pages.
(Continued)

*Primary Examiner* — Feng-Tzer Tzeng
(74) *Attorney, Agent, or Firm* — Nicholson De Vos Webster & Elliott LLP

(57) ABSTRACT

An interactive system may be implemented in part by an audio device located within a user environment, which may accept speech commands from a user and may also interact with the user by means of generated speech. In order to improve performance of the interactive system, a user may use a separate device, such as a personal computer or mobile device, to access a graphical user interface that lists details of historical speech interactions. The graphical user interface may be configured to allow the user to provide feedback and/or corrections regarding the details of specific interactions.

20 Claims, 6 Drawing Sheets

Related U.S. Application Data continuation of application No. 17/195,127, filed on Mar. 8, 2021, now Pat. No. 11,990,119, which is a continuation of application No. 16/664,459, filed on Oct. 25, 2019, now Pat. No. 10,950,220, which is a continuation of application No. 15/925,397, filed on Mar. 19, 2018, now Pat. No. 10,460,719, which is a continuation of application No. 13/739,826, filed on Jan. 11, 2013, now Pat. No. 9,922,639.

(51) Int. Cl.
| | | |
|---|---|---|
| *G10L 15/01* | (2013.01) | |
| *G10L 15/26* | (2006.01) | |

(56) References Cited

U.S. PATENT DOCUMENTS

| | | | |
|---|---|---|---|
| 6,278,975 | B1 | 8/2001 | Brant et al. |
| 6,532,446 | B1 | 3/2003 | King |
| 7,418,392 | B1 | 8/2008 | Mozer et al. |
| 7,444,353 | B1 | 10/2008 | Chen et al. |
| 7,720,683 | B1 | 5/2010 | Vermeulen et al. |
| 7,774,204 | B2 | 8/2010 | Mozer et al. |
| 8,073,681 | B2 | 12/2011 | Baldwin et al. |
| 8,452,602 | B1 * | 5/2013 | Bringert .................. G10L 15/22 704/251 |
| 8,660,847 | B2 | 2/2014 | Soemo et al. |
| 9,049,696 | B2 | 6/2015 | Sansalone |
| 9,583,100 | B2 | 2/2017 | Burke et al. |
| 9,691,390 | B2 | 6/2017 | Stonehocker et al. |
| 2001/0016815 | A1 * | 8/2001 | Takahashi ............... G10L 15/26 704/235 |
| 2001/0047263 | A1 | 11/2001 | Smith et al. |
| 2002/0002465 | A1 | 1/2002 | Maes |
| 2003/0026413 | A1 | 2/2003 | Brandt et al. |
| 2007/0043574 | A1 | 2/2007 | Coffman et al. |
| 2007/0276651 | A1 | 11/2007 | Bliss et al. |
| 2009/0150156 | A1 * | 6/2009 | Kennewick ........ G01C 21/3608 704/275 |
| 2009/0182587 | A1 | 7/2009 | Lewis |
| 2009/0307189 | A1 * | 12/2009 | Bobbitt .................. G06F 16/00 |
| 2010/0031299 | A1 | 2/2010 | Harrang et al. |
| 2010/0313221 | A1 * | 12/2010 | Ellis ................. H04N 21/26283 725/40 |
| 2012/0016678 | A1 | 1/2012 | Gruber et al. |
| 2012/0223885 | A1 | 9/2012 | Perez |
| 2013/0108030 | A1 | 5/2013 | Snir et al. |
| 2014/0156268 | A1 | 6/2014 | Arizmendi et al. |
| 2015/0187350 | A1 * | 7/2015 | Kim ........................ G10L 15/01 704/231 |

OTHER PUBLICATIONS

Office Action for U.S. Appl. No. 17/731,968, mailed on May 25, 2023, Inventor #1 Gilles Jean Roger Belin, "User Feedback for Speech Interactions," 14 pages.

Office Action for U.S. Appl. No. 16/664,459, mailed on Aug. 4, 2020, Belin, "User Feedback for Speech Interactions", 5 Pages.

Office Action for U.S. Appl. No. 17/731,968, mailed on Oct. 12, 2023, Inventor #1 Gilles Jean Roger Belin, "User Feedback for Speech Interactions," 14 pages.

Office action for U.S. Appl. No. 13/739,826, mailed on Oct. 29, 2015, Belin et al., "User Feedback for Speech Interactions", 28 pages.

Office action for U.S. Appl. No. 13/739,826, mailed on Oct. 3, 2014, Belin et al., "User Feedback for Speech Interactions", 14 pages.

Office Action for U.S. Appl. No. 17/731,968, mailed on Dec. 8, 2022, Gilles Jean Roger Belin, "User Feedback for Speech Interactions", 12 pages.

Final Offie Action dtd Dec. 18, 2018 for U.S. Appl. No. 15/925,397 "User Feedback for Speech Interactions" Belin, 13 pages.

Office action for U.S. Appl. No. 13/739,826, mailed on Feb. 24, 2017, Belin et al., "User Feedback for Speech Interactions", 30 pages.

Office Action for U.S. Appl. No. 17/195,127, mailed on Mar. 10, 2023, Belin, "User Feedback for Speech Interactions", 10 Pages.

Office action for U.S. Appl. No. 13/739,826, mailed on Apr. 21, 2016, Belin et al., "User Feedback for Speech Interactions", 30 pages.

Office action for U.S. Appl. No. 13/739,826 mailed on May 6, 2015, Belin et al., "User Feedback for Speech Interactions", 18 pages.

Office Action for U.S. Appl. No. 15/925,397. mailed on Jul. 26, 2018, Belin, "User Feedback for Speech Interactions", 11 pages.

Office Action for U.S. Appl. No. 17/195,127, mailed on Aug. 17, 2023, Inventor #1 Gilles Jean Roger Belin, "User Feedback for Speech Interactions," 7 pages.

Office Action for U.S. Appl. No. 17/195,127, mailed on Sep. 9, 2022, Belin, "User Feedback for Speech Interactions", 8 pages.

Pinhanez, "The Everywhere Displays Projector: A Device to Create Ubiquitous Graphical Interfaces", IBM Thomas Watson Research Center, Ubicomp, Sep. 30, 2001-Oct. 2, 2001, 18 pages.

Advisory Action, U.S. Appl. No. 17/731,968, Aug. 23, 2023, 3 pages.

Final Office Action, U.S. Appl. No. 16/664,459, Aug. 4, 2020, 6 pages.

Final Office Action, U.S. Appl. No. 17/195,127, Mar. 10, 2023, 11 pages.

Final Office Action, U.S. Appl. No. 17/731,968, May 25, 2023, 15 pages.

Non-Final Office Action, U.S. Appl. No. 16/664,459, Feb. 20, 2020, 12 pages.

Non-Final Office Action, U.S. Appl. No. 17/195,127, Aug. 17, 2023, 8 pages.

Non-Final Office Action, U.S. Appl. No. 17/195,127, Sep. 9, 2022, 9 pages.

Non-Final Office Action, U.S. Appl. No. 17/731,968, Dec. 8, 2022, 13 pages.

Non-Final Office Action, U.S. Appl. No. 17/731,968, Oct. 12, 2023, 15 pages.

Notice of Allowance, U.S. Appl. No. 16/664,459, Nov. 12, 2020, 8 pages.

Notice of Allowance, U.S. Appl. No. 17/195,127, Jan. 18, 2024, 8 pages.

Notice of Allowance, U.S. Appl. No. 17/731,968, Feb. 7, 2024, 9 pages.

* cited by examiner

USER FEEDBACK FOR SPEECH INTERACTIONS

CROSS REFERENCE TO RELATED PATENT APPLICATIONS

This application is a continuation of and claims priority to commonly assigned, co-pending, U.S. patent application Ser. No. 17/731,968, filed Apr. 28, 2022, which claims priority to commonly assigned, co-pending, U.S. patent application Ser. No. 17/195,127, filed Mar. 8, 2021, which is a continuation of and claims priority to commonly assigned, co-pending, U.S. patent application Ser. No. 16/664,459, filed Oct. 25, 2019, which is a continuation of U.S. patent application Ser. No. 15/925,397, filed Mar. 19, 2018 (now U.S. Pat. No. 10,460,719, Issued Oct. 29, 2019), which is a continuation of U.S. patent application Ser. No. 13/739,826, filed Jan. 11, 2013 (now U.S. Pat. No. 9,922,639, Issued Mar. 20, 2018). Application Ser. Nos. 16/664,459, 15/925,397 and 13/739,826 and U.S. Pat. Nos. 10,460,719 and 9,922,639 are fully incorporated herein by reference.

BACKGROUND

Many different ways have been introduced to allow users to interact with devices and services, such as mechanical means (e.g., keyboards, mice, etc.), touch screens, motion, and gesture. In addition, speech may be used to interact with computing devices. However, speech interactions are often more prone to errors than other types of user interactions. Errors and inaccuracies may include problems with speech recognition and understanding as well as with speech generation when responding to users.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure describes devices, systems, and services that interact with users through speech. In some situations, such devices, systems and services may interact with users solely through speech, and may lack other means of user interaction such as mechanical or graphical user interfaces. Speech interaction may involve automatic speech recognition (ASR), natural language understanding (NLU), text-to-speech (TTS) conversion, and other processing techniques.

In a speech interaction, a speech interface platform may receive audio containing a speech utterance by a user. The platform may perform ASR to determine the words uttered by the user, and may then perform NLU with respect to the uttered words to determine or interpret the intent of the user. The platform may then perform an action corresponding to the intent of the user. Depending on the user intent, the action may include generating and rendering a speech response for the user using TTS.

ASR, NLU, and TTS are typically based on statistical models that are compiled based on training and observed examples. Although the statistical models are comprehensive, they can result in mistakes in certain situations. In most cases, the models can be improved by incorporating additional training and analyzed examples.

In accordance with embodiments described herein, a user of a speech interaction platform may be provided with a graphical user interface for giving feedback regarding the performance of the speech interaction platform. The feedback may relate to speech recognition, understanding, and/or generation. The graphical user interface may indicate one or more historical interactions to the user so that the user can correct any mistakes made by the platform. The platform may be configured to receive the corrections and to use the corrections to improve future performance. For example, the platform may use the information received from the user to update or improve the statistical models upon which speech recognition, understanding, and generation are based.

Figure 1:
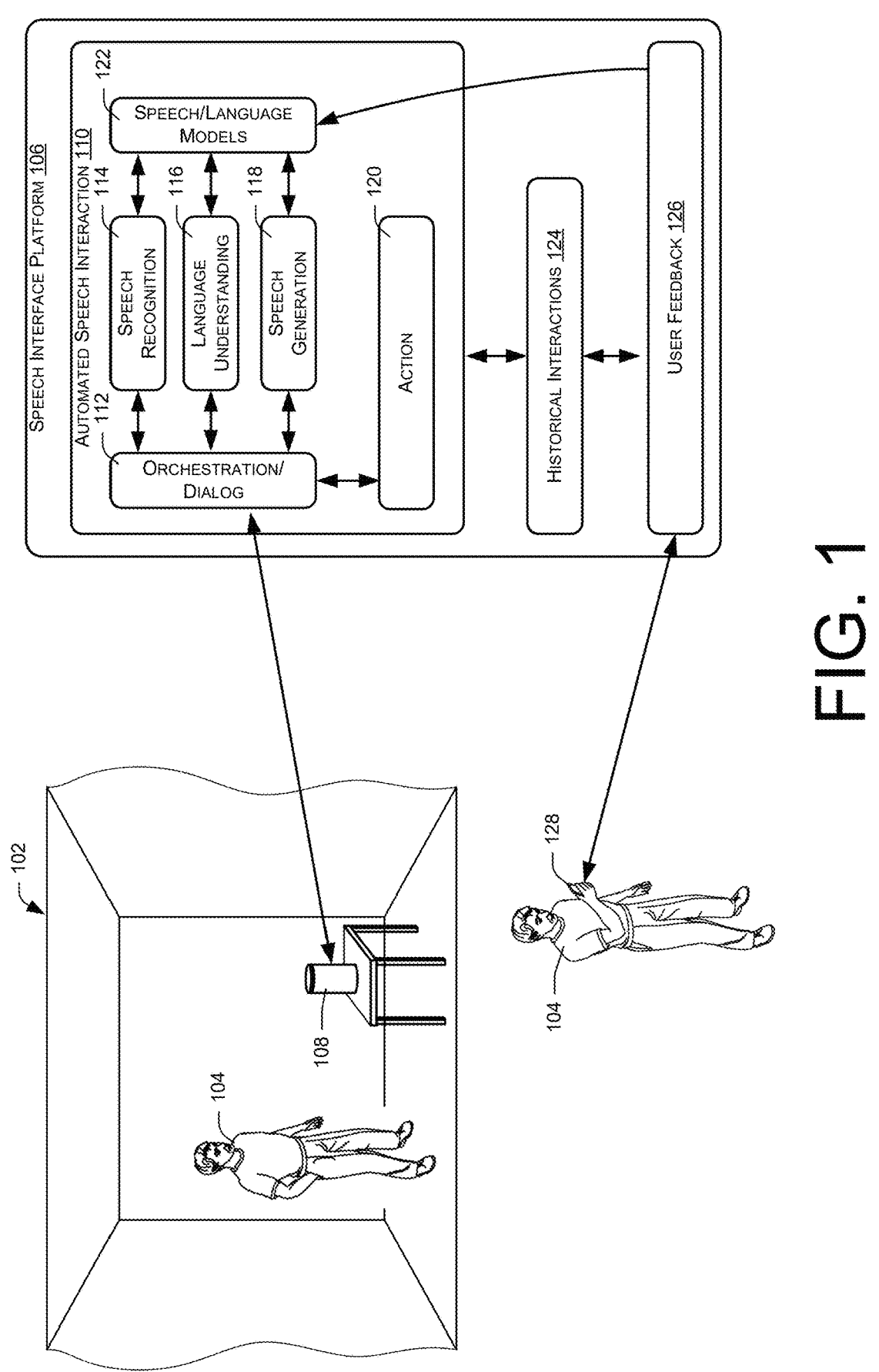
FIG. 1 shows an illustrative environment in which a speech interface platform may be accessed by a user from a home.

FIG. 1 shows an example speech interaction system set in a home environment 102 that includes a user 104. The system includes an interactive speech interface platform 106 that is configured to receive audio from the environment 102, to recognize user speech in the audio, to interpret user intent from the recognized speech, and to perform one or more actions based on the interpreted user intent.

The speech interface platform 106 includes or works in conjunction with an electronic speech interface or device 108 that is positioned within the environment 102. The speech interface 108 may be positioned in any number of locations (e.g., ceiling, wall, in a lamp, beneath a table, under a chair, etc.). More than one speech interface 108 may be positioned in a single room, or one speech interface 108 may be used to accommodate user interactions from more than one room.

Generally, the speech interface 108 has at least one microphone and at least one speaker to facilitate speech interactions between the user 104 and the speech interface platform 106. In some instances, the speech interface 108 may be implemented without a haptic input component (e.g., keyboard, keypad, touch screen, joystick, control buttons, etc.) or display. In certain implementations, a limited set of one or more haptic input components may be employed (e.g., a dedicated button to initiate a configuration, power on/off, etc.). Nonetheless, the primary and potentially only mode of user interaction with the speech interface platform 106 may be through voice input and audible output.

The speech interface platform 106 may comprise a network-based service and may be accessible through a public or wide-area network such as the Internet. In other embodiments, the speech interface platform 106 may be local to the environment 102.

More generally, the functionality described with respect to the speech interface platform 106 may be distributed in different locations and performed by various interacting components or entities. As an example, some or all of the functionality described herein as being performed by the speech interface platform 106 may be performed by or within the speech interface 108, and/or the speech interface 108 may form an integral part of the speech interface platform 106, which may be located within the user environment 102.

The speech interface platform 106 has an automated speech interaction component 110 that analyzes audio received from the environment 102 to detect user utterances, to determine user intent based on the utterances, and to perform actions in fulfillment of the user intent. For example, the user may speak predefined commands (e.g., "Awake"; "Sleep"), or may use a more casual conversation style when interacting with the speech interface 108 (e.g., "I'd like to go to a movie. Please tell me what's playing at the local cinema."). User commands may be for essentially any type of operation, such as database inquires, requesting and consuming entertainment (e.g., gaming, finding and playing music, movies or other content, etc.), personal management (e.g., calendaring, note taking, etc.), online shopping, financial transactions, and so forth.

In operation, the automated speech interaction component 110 receives an audio signal containing audio-based information from the speech interface 108. The audio-based information may comprise a continuous audio stream from the speech interface 108. Alternatively, the audio-based information may comprise audio clips or segments, provided to the automated speech interaction component 110 in response to detected audio activity within the environment 102.

The audio-based information may in some cases be processed by the speech interface 108 before being provided to the speech interface platform 106. For example, the audio-based information may be compressed, filtered, or otherwise optimized. In some cases, the speech interface 108 may perform initial speech recognition, and the audio-based information may comprise text that has been recognized from the user speech. As mentioned above, various of the functions shown as being performed by the speech interface platform 106 may be implemented instead by the speech interface 108.

The automated speech interaction component 110 of the speech interface platform 106 may include a coordination/dialog component 112, a speech recognition component 114, a natural language understanding component 116, a speech generation component 118, and an action component 120.

The coordination/dialog component 112 receives the audio-based information generated by the speech interface 108 and coordinates the subsequent interactions with the user 104 and the operations performed by the automated speech interaction component 110. For example, the coordination/dialog component 112 may utilize the speech recognition component 114 and the language understanding component 116 to recognize user utterances and intents. The coordination/dialog component 112 may also utilize the speech generation component 118 to render speech to the user and to engage the user 104 in a dialog or conversation. In response to determining user intent, the coordination/dialog component 112 may utilize the action component 120 to perform corresponding actions.

The automated speech interaction component 110 may include or have access to speech/language models 122, which may be used by the speech recognition component

114, the language understanding component 116, and the speech generation component 118 for understanding user utterances and intents, and for generating or synthesizing speech for rendering to the user 104 by the speech interface 108.

More detailed information regarding the operation and configuration of an automated speech interface component is described in U.S. Provisional Patent Application No. 61/696,055, filed Aug. 31, 2012, which is hereby incorporated by reference.

The speech interface platform 106 may be configured to maintain a store or repository 124 of information or records regarding historical user interactions. An interaction record corresponding to a user interaction may include one or more of the following:

date and time of the interaction;

user audio of one or more user commands or utterances;

text indicating any speech recognized from the user audio;

user intent as interpreted by the automated speech interaction component 110 based on the recognized text;

an action that was performed by the automated speech interaction component 110 based on the interpreted intent;

text of any spoken response to the user command generated by the automated speech interaction component 110;

audio of any spoken response generated by the automated speech interaction component.

The speech interface platform 106 of the described embodiment has a user feedback component 126, which is accessible to the user 104 through means that are independent of the speech interface 108. For example, the user feedback component 126 may be accessible through an application running on a user device 128 associated with the user 104, other than the speech interface 108. As another example, the user feedback component 126 may be accessible through a browser or other graphical interface of any computer or computer-like device, including personal computers, portable computers, tablets, media devices, smartphones, and so forth. In some cases, the user feedback component 126 may comprise a web page generated for display in conjunction with an Internet browser, and may thus be accessible through any device capable of displaying web content.

The user feedback component 126 and the user device 128 interact to form a graphical user interface through which the user may edit and/or evaluate the historical interactions 124. In some cases, the user may provide relatively simple feedback, such as a binary indication of whether a particular interaction was interpreted and performed correctly. Additional feedback may be accepted in other cases, ranging from free-form comments regarding the interaction to specific corrections regarding individual elements of the interaction. The feedback provided by the user may be used by components of the automated speech interaction component 110 in future interactions, to improve the performance of the speech interface platform 106. For example, the user feedback may form the basis for updates, modifications, additions, or refinements to the speech/language models 122. Such modifications, additions, or refinements may be the result of either manual or automated analysis of the user feedback.

FIGS. 2-5 show examples of graphical user interfaces that may be generated by the speech interface platform 106 and/or the user device 128 to solicit and receive feedback from the user 104 regarding historical interactions between the user 104 and the speech interface platform 106.

Figures 2, 3:
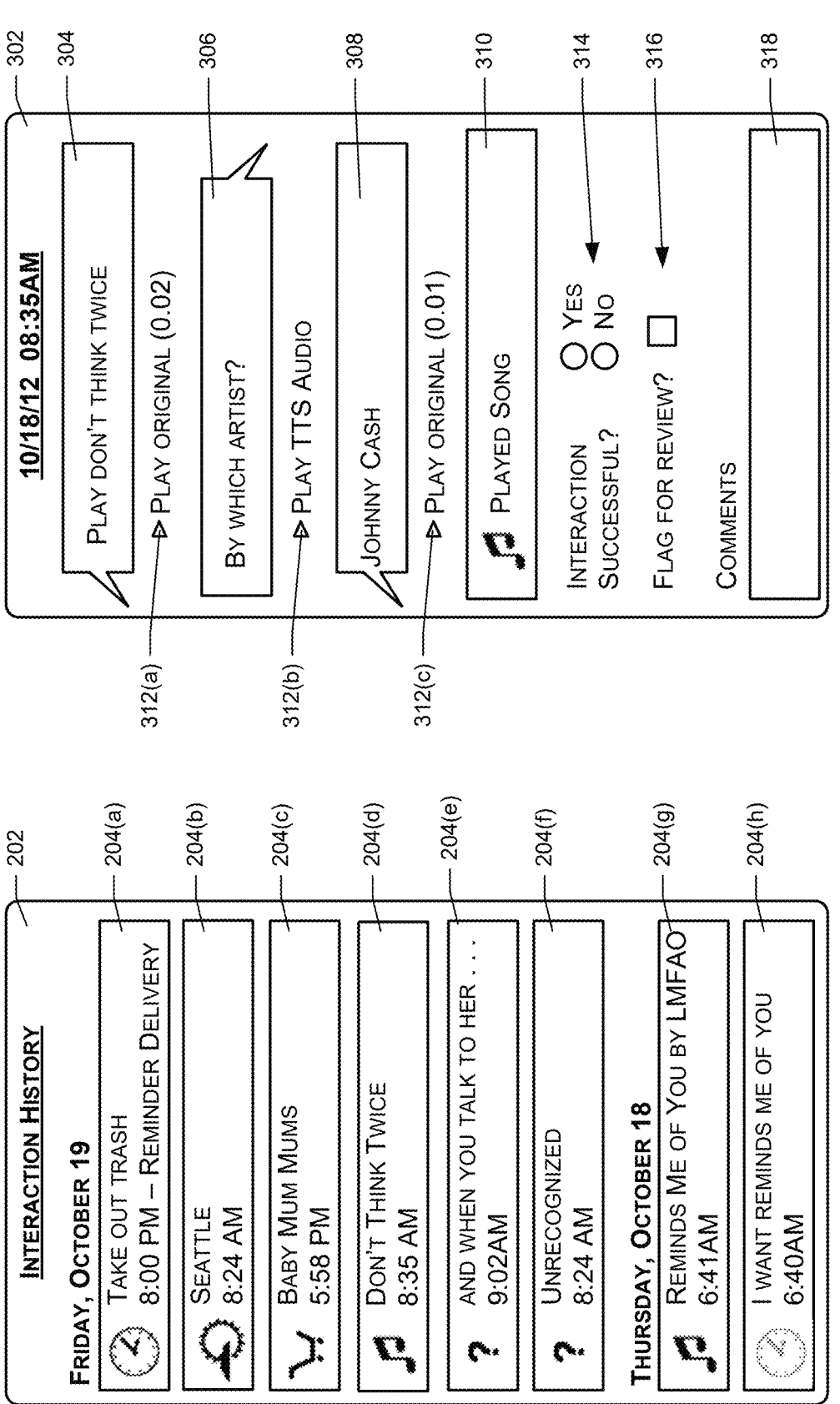
FIGS. 2-6 show examples of user interface elements that may be used to provide feedback from the user to the speech interface platform regarding individual speech interactions.

FIG. 2 shows a graphical user interface 202 configured to provide a listing of historical interaction records 204 between the user 104 and the speech interface platform 106. The interaction records 204 may be listed in an appropriate order, such as the reverse chronological order shown, and may be grouped by day or some other unit of time as shown.

An individual interaction record 204 indicates any recognized intent of the user as determined or deduced by the speech interface platform 106 in response to one or more spoken utterances of the user. In addition, each interaction record 204 indicates any action taken by the speech interface platform 106 in response to the intent.

In this example, intent is indicated by a combination of a domain icon and a textual intent line. Domains may include calendaring, reminders, shopping lists, task lists, other lists, media playback, weather, email, and so forth. The first textual line of each interaction record indicates the more specific interpreted intent of the user relevant to the indicated domain.

As an example, the interaction record 204(a) indicates that an intent of the user was interpreted as being related to a domain of calendaring or reminders, as indicated by the clock domain icon at the left of the interaction record 204(a). The intent relative to the reminder domain is indicated more specifically by the first textual line of the interaction record 204(a). In this case, the interaction record 204(a) indicates that the specific intent of the user relative to the reminder domain was to "take out trash."

In some cases, the indicated textual intent line may specify the actual words recognized from a user utterance. In other cases, the textual intent line may indicate paraphrased or more concise text corresponding to the user utterance. For example, if the user says "what is the weather in Seattle," the textual intent line may simply read "Seattle," which in conjunction with the domain icon may be understood to mean that the user requested information regarding the weather in Seattle. The interaction record 204(b) shows this example.

In some cases, the second line of an interaction record 204 may indicate detail regarding the specific action performed by the speech interface platform 106. In the example of the interaction record 204(a), the specific action is more specifically described by the second line of the record as being to deliver a reminder. In other cases, such as in the other interaction records 204 of FIG. 2, the action performed by the speech interface platform 106 may be inferred by the user from the combination of the domain icon and the textual intent line.

As a further example, the interaction record 204(c) indicates a shopping list domain, as indicated by the shopping cart domain icon. In this example, the user was interpreted as requesting that the item "Baby Mum Mums" be added to a shopping list.

Similarly, the interaction record 204(d) indicates that the user requested playback of a song entitled "Don't Think Twice."

The interaction record 204(e) has a question mark icon, indicating that a relevant domain could not be identified from the user utterance. The textual intent line in this case indicates the utterance of the user in textual form, as recognized by the ASR of the speech interface platform 106. Because a domain is not identified, it is understood that the speech interface platform took no action in response to this user utterance. The recognized user utterance in this example may have been background speech, and may not have been intended as a command for the speech interface platform 106.

The interaction record 204(f) is another example in which a relevant domain was not found, as indicated by the question mark icon. In this case, however, the speech interface system was unable to recognize the speech contained in the user utterance, as indicated by the word "unrecognized" in the textual intent line.

The interaction record 204(g) is another example of a user intent relative to the music domain, which in this case comprises playing a song entitled "Reminds Me Of You," by the artist LMFAO.

The interaction record 204(h) shows an example in which the user uttered the phrase "I want reminds me of you," which the speech interface platform 106 interpreted as a request relative to the reminder domain to schedule a reminder. The clock icon is greyed in this case, indicating that the reminder was set for the future. It is likely that the user intended to request playback of the song "Reminds Me Of You" rather than a reminder.

Various additional types of interactions may be shown by the interface 202, not limited to the specific types of interactions shown. Certain interactions may relate to control of the platform 106 itself. For example, certain words may be reserved for system control, such as to activate or deactivate the platform 106. Thus, a flag word such as "wake" may be used in some embodiments to alert the platform that subsequent user speech is intended to form a command. The interface 202 may be configured to allow feedback regarding such system control utterances, responses, and actions.

As another example, some systems may accept input from different users, and may categorize the historical interactions by the identity of the user with whom the interaction was made. In some cases, a particular user may be given the ability to see interactions by other users, and may also be given the ability to correct system user identifications. In addition, users may be allowed to individually delete historical transactions.

A user may peruse the interface 202 to edit or evaluate performance of the speech interface platform 106 and to identify interactions that were not performed correctly. In the example of FIG. 2, it is likely that the interactions 204(f) and 204(h) were not performed as intended by the user.

The user interface 202 allows a user to edit or evaluate ASR and NLU performance of the speech interface platform 106. In addition, the user may edit or evaluate TTS performance relative to speech that is rendered by the speech interface platform 106 to the user 104 using the speech generation component 118.

The user may select any one of the displayed interaction records 204 to examine details of the interactions and to critique or correct aspects of the interactions. The details of an interaction may include results of ASR and/or NLU, as well as audio corresponding to user speech and TTS-generated speech. In response to observed errors in ASR, NLU, TTS, or other aspects of responding to a user command, the user may indicate such errors, and such indications will be passed to the speech interface system 106 or to administrators of the speech interface platform 106. The errors may then be further analyzed to improve future performance.

In the embodiments described herein, the user may also provide edits or evaluations regarding responses of the speech interface platform 106, and the speech interface platform 106 may use such corrections as the basis for improving future performance. For example, the speech/language models 122 may be automatically or manually updated to reflect corrections made by one or more users.

FIG. 3 shows a graphical user interface 302 that may be presented to a user to solicit feedback regarding whether the speech interface platform 106 performed correctly in response to a user command or utterance. The interface 302 also allows the user to provide feedback regarding certain aspects of the interaction. Note that a particular implementation may employ one or more of the user feedback/ correction elements and mechanisms described with reference to FIGS. 3-5. In this example, the interface 302 is generated in response to the user selection of the interaction record 204(*d*).

In the interface 302, an interaction is visualized as a turn-by-turn dialog between the user and the platform. It is a collection of user utterances and TTS replies, followed by the action (if any) taken by the platform to fulfill the user's request. A user can select any item in this view to observe and correct the respective details. The interface 302 also allows more general feedback, such as whether or not the interaction was successful, whether the interaction should be manually reviewed, and any general comments regarding the interaction.

More specifically, a field 304 indicates text of a user utterance, based on ASR performed by the platform 106. A field 306 indicates text of a response generated by the platform and rendered as speech to the user 104. A field 308 indicates the text of a reply by the user, based again on ASR performed by the platform 106. A field 310 indicates the action that was taken by the platform 106, including the domain and a more specific textual action.

The first three fields, 304, 306, and 308, relate to speech that is either recognized or generated by the platform 106. A playback control 312 is associated with each of these fields so that a user can listen to the audio associated with the text displayed in the fields. For example, the user may select the control 312(*a*) to listen to a recording of the user speech responsible for generating the text "play don't think twice" as recognized by the platform 106. The user may select the control 312(*b*) to listen to a playback of the audio generated by the platform 106 in response to the user speech. The user may select the control 312(*c*) to listen to a recording of the user speech or utterance responsible for recognition of the text "Johnny Cash."

The user may peruse the information available from the interface 302 to determine whether the interaction was performed correctly, and may correct aspects of the interaction or provide feedback regarding the interaction. For example, the user may edit the textual fields 304 and 308 to provide corrections to the text that was recognized by the platform 106 in response to user utterances. Alternatively, or in addition, the user may indicate more generally through a control 314 whether the interaction was successful. The user may also indicate through a control 316 that the interaction should be flagged for review by an administrator of the platform 106. The user may also provide comments in a comment field 318, for submission to administrators of the platform 106.

Figure 4:
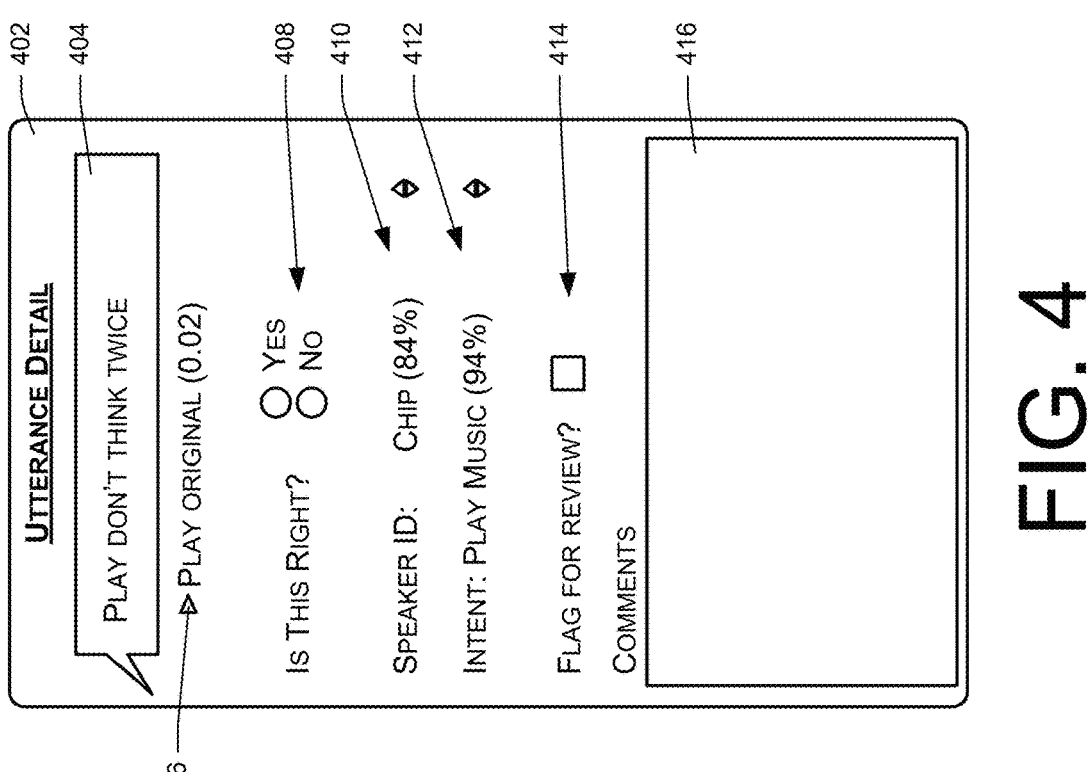

FIG. 4 shows an utterance detail interface 402 that is generated in response to the user selecting either of the textual fields 304 or 308. The utterance detail interface 402 displays details regarding an utterance by a user, such one of the utterances represented by the fields 304 and 308 of FIG. 3. The details may include the recognized text corresponding to the utterance, controls allowing a user to comment on or rate the quality of the ASR and/or NLU performed by the platform 106 with respect to the utterance, and other information.

More specifically, in this example the utterance detail interface 402 includes a text field 404 containing the text produced by the ASR functionality of the platform 106 in response to an utterance by the user. The text field 404 is editable, so that the user can correct any mistakes in the ASR response. For example, the user might enter the text "Play I won't think twice" to indicate the correct text corresponding to the user's actual utterance, as opposed to the phrase "Play don't think twice" that was mistakenly recognized by the platform 106.

A selectable control 406 may be associated with the text field 404, allowing the user to hear the audio associated with the original user utterance.

The utterance detail interface 402 may include a rating control 408, allowing the user to rate the performance of the ASR and/or NLU with respect to the utterance. In this case, the control 408 allows the user to indicate whether or not the text presented in the field 404 accurately represents the utterance of the user.

In some embodiments, the platform 106 may identify different users by voice identification, and may respond differently depending on the identity of the user who has made the utterance. In this situation, the utterance detail interface 402 may have a field 410 indicating the identity of the user, along with the confidence level (expressed as a percentage) with which the platform 106 has made the identification. The user may in some cases be allowed to correct this identification using a pull-down menu or other means. For example, the user may be able to select from different users that were considered by the platform 106.

The utterance detail interface 402 may also have a field 412 indicating the intent demonstrated by the utterance, as determined by the NLU capabilities of the platform 106, along with the confidence level (expressed as a percentage) with which the platform 106 has made the determination. The user in some cases may be allowed to correct the intent through a pull-down menu or other means. For example, the user may be able to select from different possible intents that were considered by the platform 106, or may be able to expressly enter an intent.

The utterance detail interface 402 may also have a control 414 that the user can select to indicate that the utterance should be flagged for manual review by administrators of the platform 106.

The utterance detail interface 402 may further have a comments field 416, into which the user may enter comments or other feedback for review by administrators of the platform 106.

Figure 5:
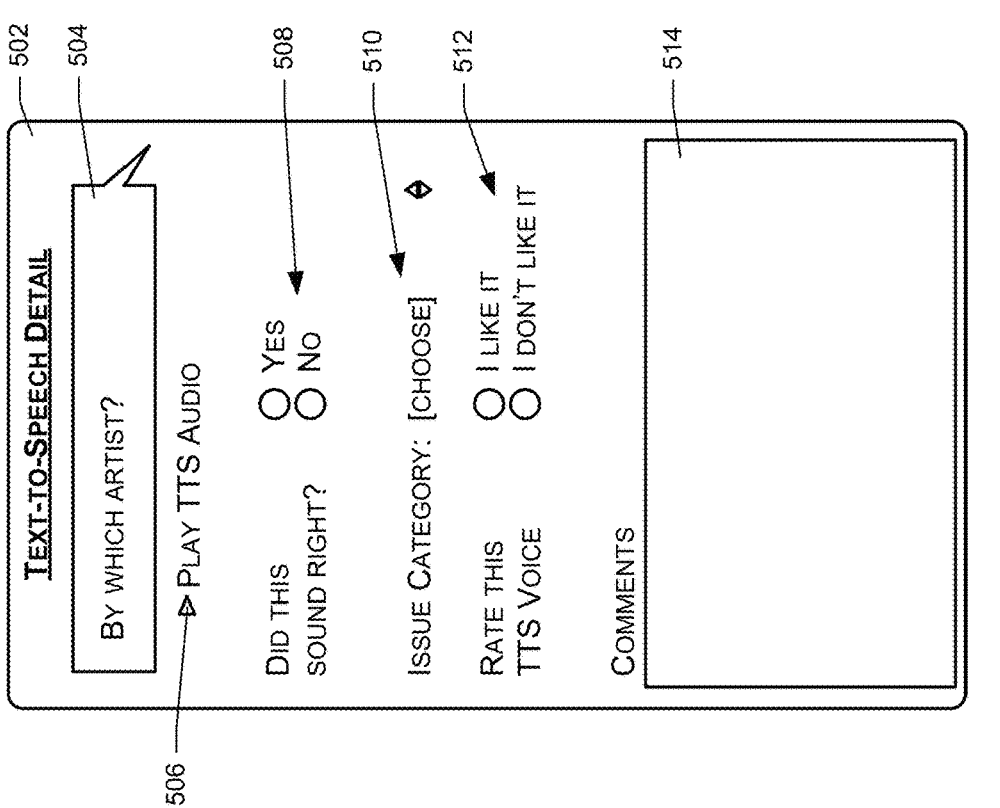

FIG. 5 shows a TTS detail interface 502 that may be generated in response to user selection of the textual field 306 of FIG. 3, which corresponds to TTS speech generated by the platform 106. The TTS detail interface 502 includes a text field 504 containing the text produced by the platform 106 in response to an initial user utterance. The text field 504 is editable, so that the user can provide corrections or suggestions regarding the response. A selectable control 506 may be associated with the text field 404, allowing the user to hear a TTS-generated playback of the platform response.

The TTS detail interface 502 may include a rating control 508, allowing the user to rate the performance of the TTS performed by the platform 106. The control 508 allows the user to indicate whether or not the generated speech sounded right to the user.

Assuming that there was a perceived problem in the TTS audio, the user may select a control 510 to specify the issue that was perceived to be a problem with the audio. The user may simply enter a description of the issue, or may select from different categories, which may be enumerated.

The TTS detail interface 502 may have a control 512 through which the user can rate the voice used for TTS speech.

The TTS detail interface 502 may further have a comments field 514, into which the user may enter comments or other feedback for review by administrators of the platform 106.

Figure 6:
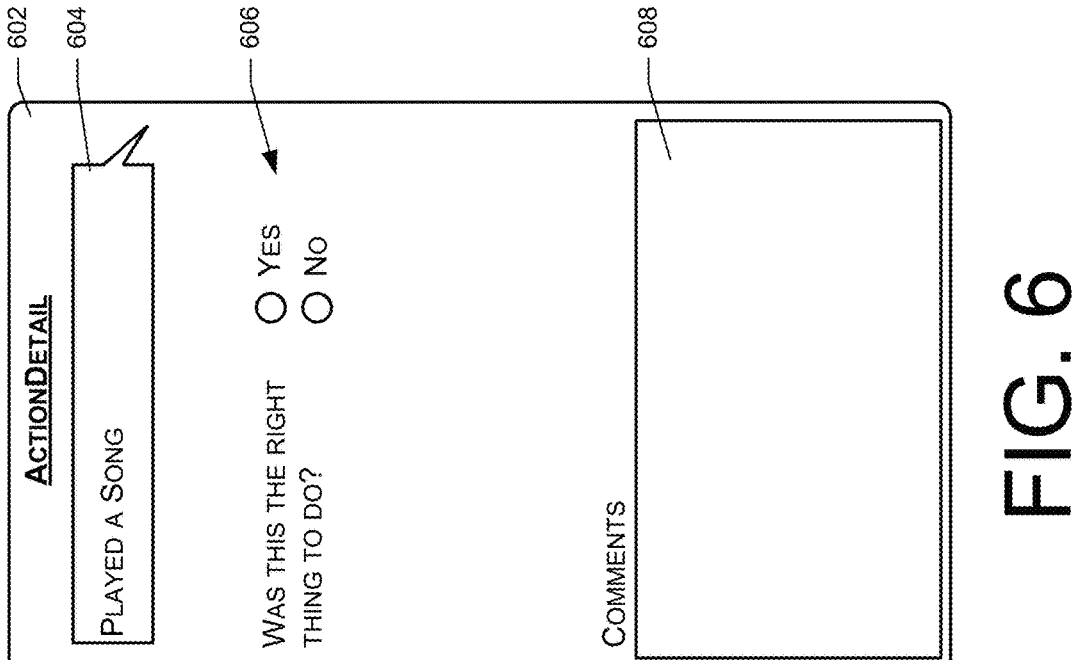

FIG. 6 shows an action detail interface 602 that may be generated in response to user selection of the action field 310 of FIG. 3, which indicates the action that was performed by the platform 106 in response to a user commend. The action detail interface 602 includes a text field 604 indicating the action that was performed in response to the understood user speech. A feedback control 606 allows the user to indicate whether the action was the action intended by the user. A comment field 608 allows the user to indicate further comments regarding the action, such as an indication of the user's actual intent. In other embodiments, the action detail 602 may allow the user to select from multiple alternative actions that may have been considered by the platform 106.

Figure 7:
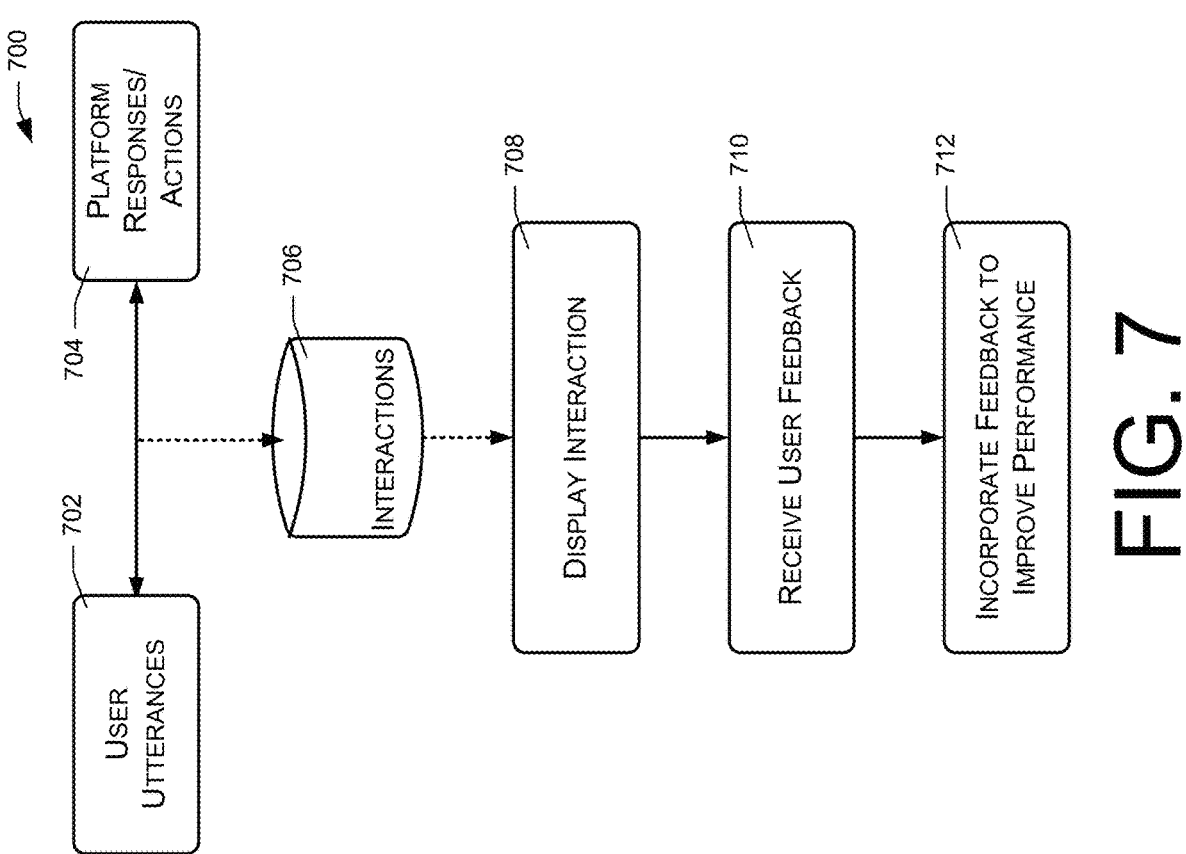
FIG. 7 illustrates an example process for interacting with a user by voice and for receiving feedback from the user regarding speech interactions.

FIG. 7 illustrates an example method 700 that may be performed to interact with a user with speech and to solicit feedback and/or corrections from the user regarding speech interactions. Interactions between the user and the platform comprise user utterances 702 and platform responses and/or actions 704. Records of these interactions are stored in an interaction repository 706. The interaction repository 706 may contain records of multiple previous or historical transactions.

An action 708 comprises providing and/or displaying information regarding individual interactions to the user. The interactions may be displayed in a format similar to that described above, or in various other formats. In some embodiments, the information may be provided by an online service or platform to a personal computing device of the user, such as a personal computer, smartphone, media device, tablet computing device, etc.

An action 710 may comprise soliciting and/or receiving user feedback regarding the interactions, and more specifically regarding the displayed information regarding the interactions. The action 710 may comprise generating and presenting a graphical interface to the user, and receiving data or information entered by the user regarding interactions. The user may provide general feedback regarding accuracy and suitability of an interaction, and may also provide specific corrections to such things as automatic speech recognition, natural language understanding, and text-to-speech generation. The user may also be provided the ability to provide ratings regarding individual interactions, and may be given the ability to listen to recorded audio of user utterances and generated speech that were used as part of the interaction.

An action 712 comprises incorporating the user feedback in the data and algorithms used by the platform 106, as the basis for improving the performance of the platform with respect to future interactions. For example, received feedback may be analyzed to detect problems or defects in current ASR, NLU, and TTS techniques. In addition, or alternatively, feedback may be incorporated into existing corpuses of training examples for automated analysis and improvement of statistical models used in ASR, NLU, and TTS.

Note that although the user feedback component 126 is described above as accepting user feedback in textual form, there may be situations in which the user feedback is provided by speech.

Figure 8:
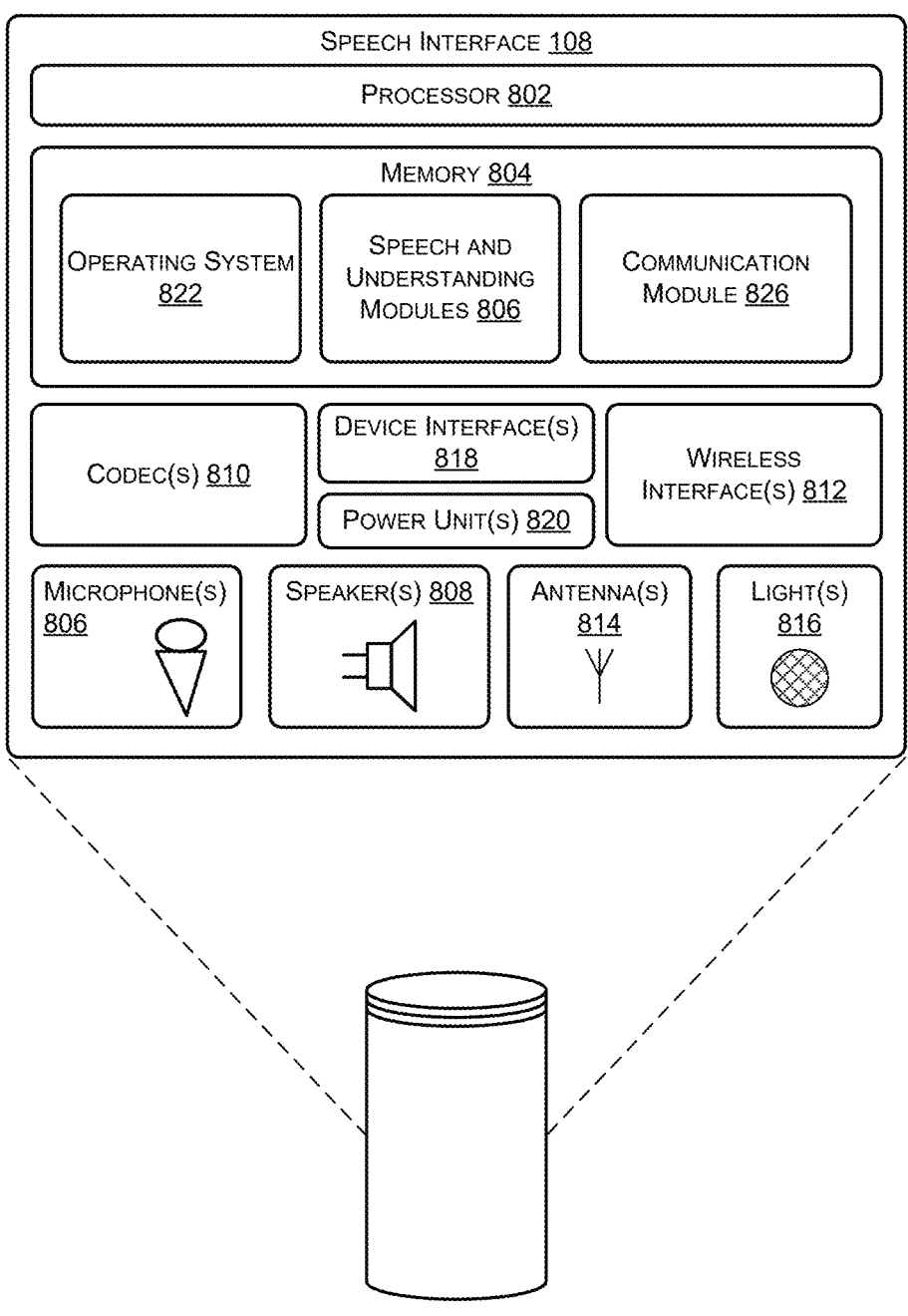
FIG. 8 is a block diagram of selected functional components implemented in a speech interface, such as in the environment of FIG. 1.

FIG. 8 shows selected functional components of the speech interface 108 in more detail. Generally, the speech interface 108 may be implemented as a standalone device that is relatively simple in terms of functional capabilities, with limited input/output components, memory and processing capabilities. For instance, the speech interface 108 may lack a keyboard, keypad, or other form of mechanical input in some implementations, and may similarly lack a display or touch screen. Instead, the speech interface 108 may be implemented with the ability to receive and output audio, a network interface (wireless or wire-based), power, and limited processing/memory capabilities.

In the illustrated implementation, the speech interface 108 includes a processor 802 and memory 804. The memory 804 may include computer-readable storage media ("CRSM"), which may be any available physical media accessible by the processor 802 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 802.

The speech interface 108 includes a microphone unit 806 that includes one or more microphones to receive audio input, such as user voice input, and one or more speakers 808 to output audio sounds. One or more codecs 810 are coupled to the microphone unit 806 and the speakers 808 to encode and/or decode the audio signals. The codec may convert audio data between analog and digital formats. A user may interact with the speech interface 108 by speaking to it, and the microphone unit 806 captures the user speech. The codec 810 encodes the user speech and transfers that audio data to other components. The speech interface 108 can communicate back to the user by emitting audible statements through the speakers 808. In this manner, the user interacts with the speech interface 108 simply through speech, without use of a keyboard or display common to other types of devices.

In the illustrated example, the speech interface 108 includes one or more wireless interfaces 812 coupled to one or more antennas 814 to facilitate a wireless connection to a network. The wireless interface 812 may implement one or more of various wireless technologies, such as WiFi, Bluetooth, RF, and so on. The speech interface 108 may also include one or more lights 816, which in some instances are arranged around a top of the cylindrical housing of the speech interface 108. The speech interface 108 may illuminate the lights in a particular pattern based on voice commands received from the user 104 to indicate to the user 104 that the speech interface 108 has received the user's particular command.

One or more device interfaces 818 (e.g., USB, broadband connection, etc.) may further be provided as part of the speech interface 108 to facilitate a wired connection to a network, or a plug-in network device that communicates with other wireless networks. One or more power units 820 are further provided to distribute power to the various components on the speech interface 108.

In one implementation, the speech interface 108 may include non-input control mechanisms, such as basic volume control button(s) for increasing/decreasing volume, as well as power and reset buttons. There may also be an additional simple light element (e.g., LED) to indicate a state such as, for example, when power is on. But, other than the described lights, the speech interface 108 might not use or need to use any input devices or displays.

Several modules such as instruction, datastores, and so forth may be stored within the memory 804 and configured to execute on the processor 802. An operating system module 822 is configured to manage hardware and services (e.g., wireless unit, USB, Codec) within and coupled to the speech interface 108 for the benefit of other modules. In addition, the memory 804 may include a speech recognition, understanding, and generation engine 824 and a communication module 826. The speech engine 824 may perform ASR and NLU on audio signals generated by the microphone unit 806, and may similarly generate speech using TTS generation for rendering on the speakers 808. In some instances, however, the engine 824 may simply monitor the ambient audio for a particular word or phrase and, upon identifying the word or phrase, begin streaming the audio to the platform 106 for more intensive ASR and other processing. The communication module 826, meanwhile, may function to provide the audio to the platform 106 and receive communications from the platform 106 response.

While the foregoing modules are described as residing on the device, some or all of these modules and components may reside additionally or alternatively at the platform 106.

Figure 9:
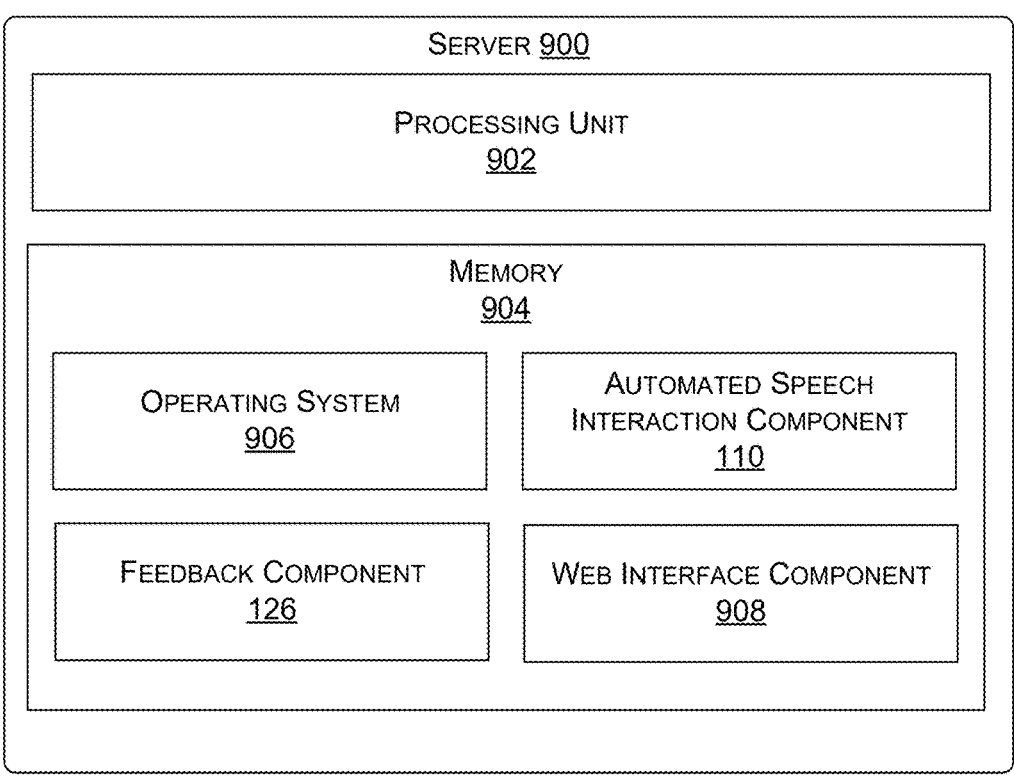
FIG. 9 is a block diagram illustrating components of a server that may be used in part to implement the speech interface platform described herein.

FIG. 9 illustrates relevant components of a server 900 that may be used to implement the functionality of the platform 106 and/or any of its components or functional elements. Generally, the platform 106 may be implemented by one or more servers, with the various functionality described above distributed in various ways across the different servers. Servers may be located together or separately, and organized as virtual servers, server banks, and/or server farms. The described functionality may be provided by the servers of a single entity or enterprise, or may utilize the servers and/or services of multiple entities or enterprises.

In a very basic configuration, an example server 900 may comprise a processing unit 902 composed of one or more processors, and memory 904. Depending on the configuration of the server 900, the memory 904 may be a type of computer storage media and may include volatile and nonvolatile memory. Thus, the memory 904 may include, but is not limited to, RAM, ROM, EEPROM, flash memory, or other memory technology.

The memory 904 may be used to store any number of functional components that are executable by the processing unit 902. In many embodiments, these functional components comprise instructions or programs that are executable by the processing unit 902, and that when executed implement operational logic for performing the actions attributed above to the platform 106.

Functional components stored in the memory 904 may include an operating system 906 and a web service component 908 that interacts with remote devices such as computers, media consumption devices, and so forth.

The memory 904 may also have instructions implementing the automated speech interaction component 110, as well as the feedback component 126.

The server 900 may of course include many other logical, programmatic, and physical components that are not shown in FIG. 9.

Figure 10:
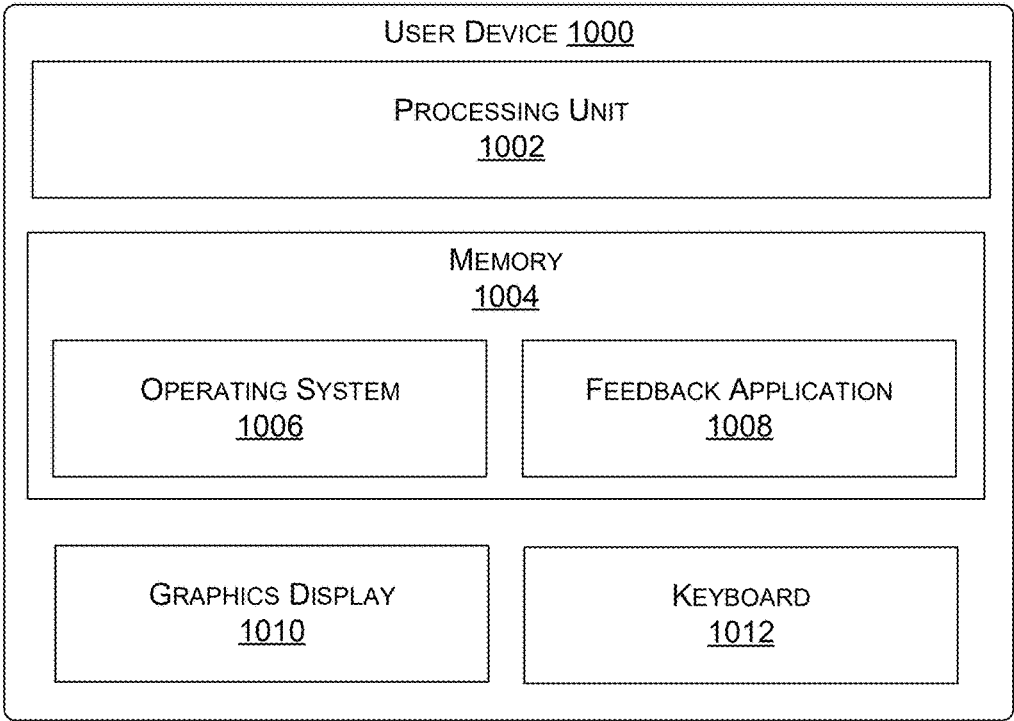
FIG. 10 is a block diagram illustrating components of a user device that may be used to present historical interactions to a user and to solicit feedback from the user regarding such historical transactions.

FIG. 10 illustrates relevant components of an example user device 1000 that may be used to generate and present the interfaces of FIGS. 2-5, as well as to communicate with the platform 106 to retrieve historical interaction information and to provide feedback and corrections from the user to the platform 106. The device 1000 may comprise a computerized device having network or other communications capabilities. For example, the device 1000 may comprise a personal computer, a tablet computer, a smartphone, a media consumption device, a gaming device, or any other type of device that is capable of generating a graphical user interface and of accepting textual input from a user.

In a very basic configuration, an example device 1000 may comprise a processing unit 1002 composed of one or more processors, and memory 1004. Depending on the configuration of the device 1000, the memory 1004 may be a type of computer storage media and may include volatile and nonvolatile memory. Thus, the memory 1004 may include, but is not limited to, RAM, ROM, EEPROM, flash memory, or other memory technology.

The memory 1004 may be used to store any number of functional components that are executable by the processing unit 1002. In many embodiments, these functional components comprise instructions or programs that are executable by the processing unit 1002, and that when executed implement operational logic for performing the actions attributed above to the platform 106.

Functional components stored in the memory 1004 may include an operating system 1006 and one or more application programs, including a feedback application 1008 that is configured to interact with the user to provide interaction information and to relay corrections and feedback from the user to the platform 106. In some embodiments, the feedback application 1008 may comprise an Internet browser directed to an appropriate server or service.

Physical components of the device 1000 may include a graphics display 1010 and a keyboard 1012 for presenting information to and receiving information from the user.

While the examples above are given in the context of an interactive voice system that performs actions in response to user commands, the techniques may be used in other situations. For example, certain types of devices may provide voice interaction capabilities without possessing suitable user interfaces for allowing users to provide feedback on the performance of the devices. In these situations, a user may utilize a second device that receives interaction information as described above, and may critique or correct the interaction information and send it back to the first device or to a platform that supports the first device.

As a specific example, a navigation device may be configured to guide a user using voice interaction, and may lack other means of user interaction. A user may provide speech commands to the navigation device, and the navigation device may provide navigation instructions using generated speech. Feedback regarding such speech interactions, including ASR, NLU, and TTS, may be provided through a separate mechanism, such as through a personal computer or smartphone associated with the user.

Although the subject matter has been described in language specific to structural features, it is to be understood that the subject matter defined in the appended claims is not necessarily limited to the specific features described. Rather, the specific features are disclosed as illustrative forms of implementing the claims.

The invention claimed is:

1. A method implemented at least in part by a computing device, the method comprising:

generating first audio data representing speech of a user captured by one or more microphones of the computing device;

presenting, on a display of the computing device, a selectable control that, when selected, initiates a request to output the first audio data representing the speech of the user;

receiving a selection of the selectable control;

causing, based at least in part on the selection, a speaker of the computing device to output the first audio data representing the speech of the user;

sending, using a wireless interface of the computing device, the first audio data representing the speech of the user to one or more remote computing devices;

receiving, from the one or more remote computing devices and via the wireless interface, text data representing text that does not accurately represent the speech of the user;

presenting the text on the display of the computing device; and sending, using the wireless interface and in response to the text data representing text that does not accurately represent the speech of the user, a request to delete data associated with the speech of the user to the one or more remote computing devices, wherein the data to be deleted is stored in a repository associated with the one or more remote computing devices.

2. The method as recited in claim 1, wherein the selectable control comprises a first selectable control, and further comprising presenting, on the display, a second selectable control associated with providing feedback regarding at least one of the text or an action performed in response to the speech of the user.

3. The method as recited in claim 1, comprising:

generating, prior to generating the first audio data, second audio data based at least in part on sound captured by the one or more microphones, the sound corresponding to a predefined utterance; and analyzing the second audio data to identify the predefined utterance.

4. The method as recited in claim 1, further comprising receiving input data via an input field presented on the display, the input data corresponding to the request to delete the data associated with the speech of the user.

5. The method as recited in claim 4, further comprising deleting the data associated with the speech of the user based at least in part on the input data.

6. The method as recited in claim 1, further comprising providing, based at least in part on input data representing a selection of the speech of the user, additional data for presentation on the display, the additional data associated with the speech of the user.

7. The method as recited in claim 1, further comprising updating, based at least in part on input data representing feedback associated with the text, at least one of a model for recognizing speech or a model for determining user intent.

8. The method as recited in claim 1, further comprising presenting, on the display, a plurality of prior utterances, the plurality of prior utterances presented in chronological order.

9. A method implemented at least in part by a first computing device, the method comprising:

receiving first audio data representing speech of a user captured by one or more microphones of a second computing device;

performing speech recognition on the first audio data to generate text data, wherein the text data corresponds to text that does not accurately represent the speech of the user;

sending the text data to a third computing device for presentation on a display of the third computing device;

causing the display of the third computing device to present a selectable control that, when selected, initiates a request to output the first audio data representing the speech of the user;

receiving a selection of the selectable control;

causing, based at least in part on the selection, a speaker of the third computing device to output the first audio data representing the speech of the user; and receiving, from the third computing device and in response to the text data corresponding to text that does not accurately represent the speech of the user, request data representing a request to delete data associated with the speech of the user, wherein the data to be deleted is stored in a repository associated with the one or more remote computing devices.

10. The method as recited in claim 9, further comprising deleting the first audio data at least partly in response to the receiving the request data.

11. The method as recited in claim 9, further comprising deleting the text data at least partly in response to the receiving the request data.

12. The method as recited in claim 9, further comprising causing the display of the third computing device to present additional text data corresponding to at least one prior utterance.

13. The method as recited in claim 9, further comprising causing the display of the third computing device to present additional text data corresponding to a plurality of prior utterances, the plurality of prior utterances presented in chronological order.

14. The method as recited in claim 9, further comprising causing the display of the third computing device to present time data indicating at least one of a date or time-of-day associated with the speech of the user.

15. A first computing device comprising:

one or more processors; and one or more computer-readable media storing computer-executable instructions that, when executed, cause the one or more processors to perform acts comprising:

receiving first audio data representing speech of a user captured by one or more microphones of a second computing device;

performing speech recognition on the first audio data to generate text data, wherein the text data corresponds to text that does not accurately represent the speech of the user;

sending the text data to a third computing device for presentation on a display of the third computing device;

causing the display of the third computing device to present a selectable control that, when selected, initiates a request to output the first audio data representing the speech of the user;

receiving a selection of the selectable control;

causing, based at least in part on the selection, a speaker of the third computing device to output the first audio data representing the speech of the user; and receiving, from the third computing device and in response to the text data corresponding to text that does not accurately represent the speech of the user, request data representing a request to delete data associated with the speech of the user, wherein the data to be deleted is stored in a repository associated with the one or more remote computing devices.

16. The first computing device as recited in claim 15, the acts further comprising deleting the first audio data at least partly in response to the receiving the request data.

17. The first computing device as recited in claim 15, the acts further comprising deleting the text data at least partly in response to the receiving the request data.

18. The first computing device as recited in claim 15, the acts further comprising causing the display of the third computing device to present additional text data corresponding to a plurality of prior utterances, the plurality of prior utterances presented in chronological order.

19. The first computing device as recited in claim 15, the acts further comprising causing the display of the third computing device to present time data indicating at least one of a date or time-of-day associated with the speech of the user.

20. The first computing device as recited in claim 15, the acts further comprising updating, based at least in part on input data representing feedback associated with the text, at least one of a model for recognizing speech or a model for determining user intent.

\* \* \* \* \*